US011776388B1

(12) United States Patent
Chaboud (10) Patent No.: US 11,776,388 B1
(45) Date of Patent: Oct. 3, 2023

(54) REMOTE CONTROL SIGNAL MASKING FOR MULTI-MODE DEVICES

(71) Applicant: Amazon Technologies, Inc., Seattle, WA (US)

(72) Inventor: Matthew L. Chaboud, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 17/119,081

(22) Filed: Dec. 11, 2020

(51) Int. Cl.
  *G08C 23/04* (2006.01)
  *G08C 17/02* (2006.01)
  *H04N 21/422* (2011.01)

(52) U.S. Cl.
  CPC ............ *G08C 23/04* (2013.01); *G08C 17/02* (2013.01); *H04N 21/42221* (2013.01); *H04N 21/42226* (2013.01); *G08C 2201/21* (2013.01); *G08C 2201/92* (2013.01)

(58) Field of Classification Search
  CPC ............ G08C 2201/92; G08C 2201/21; G08C 17/02; G08C 23/04; H04N 21/42226; H04N 21/42221
  USPC ......................................................... 348/734
  See application file for complete search history.

(56) References Cited

U.S. PATENT DOCUMENTS

| 10,168,797 B2* | 1/2019 | So .......................... G06F 3/0488 |
| 2003/0103088 A1* | 6/2003 | Dresti ................ H04N 21/8543 715/835 |
| 2016/0278151 A1* | 9/2016 | Kwon ..................... G08C 23/04 |
| 2017/0011620 A1* | 1/2017 | Metrani .................. G08C 17/00 |

* cited by examiner

*Primary Examiner* — John W Miller
*Assistant Examiner* — Omer Khalid
(74) *Attorney, Agent, or Firm* — Eversheds Sutherland (US) LLP

(57) ABSTRACT

Devices and methods are provided for masking signals from multi-mode remote control devices. A method may include receiving, by a first device, a first key command from the first device or a second device operatively connected to the first device, the first key command indicative of a first infrared (IR) command code received by the first device or the second device. The method may include receiving a non-IR message and determining, based on the message, that the first key command is associated with a second IR command code for controlling a third device. The method may include preventing, based on the determination that the first key command is associated with the second IR command code for controlling the third device, the first key command from causing the first device or the second device to perform an action.

20 Claims, 6 Drawing Sheets

[[Volume of speakers 112 is increased, and masking of command codes prevents the display 110 from also responding to the volume increase command 106 or 124]]

REMOTE CONTROL SIGNAL MASKING FOR MULTI-MODE DEVICES

BACKGROUND

People increasingly are using more devices. For example, people may consume media using televisions, stereos, game consoles, smart home devices, and the like. Some media devices may be controlled by infrared command codes. However, given the large number of infrared command codes to control many types of devices of many manufacturers, some infrared command codes may be similar to one another, resulting in one media device mistakenly identifying an infrared command code intended to control a different device. Accordingly, there is a need to avoid such mistaken identification of infrared command codes.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for remote control signal masking for multi-mode devices.

Some remote control devices may operate in multiple modes (e.g., multi-mode remote control devices). For example, a multi-mode remote control device may emit infrared (IR) codes in an IR mode, and may send other messages and codes using other wireless techniques, such as Wi-Fi (e.g., defined by the IEEE 802.11 technical standards), Bluetooth (e.g., defined by the IEEE 802.15.1 technical standard and/or the Bluetooth technical specifications), LTE (e.g., defined by the LTE technical standard), Zigbee (e.g., defined by the IEEE 802.15.4 technical standard), and/or other techniques. Some multi-mode remote control devices may control multiple devices, such as televisions, receivers, speakers, streaming media devices, game consoles, smart home devices, Internet of Things (IoT) devices, and the like using IR command codes and/or other wireless techniques.

Because of the large and growing number of devices controlled by IR command codes, the number of IR command codes needed by multi-mode remote control devices also is increasing. Some IR command codes may be similar to one another, resulting in devices identifying IR command codes that are intended for other devices. For example, an IR command code to control a stereo receiver may be similar to another IR command code to control a television. When the stereo receiver and the television receive the IR command code, both may perform corresponding actions. For example, a volume up IR command code may respond in the stereo receiver by increasing its volume (e.g., sound volume), and in the television also performing an unintended action or in sending a command to another device or to a service (e.g., an application instance executing on the television).

There is therefore a need to mask signals received from multi-mode remote control devices.

In one or more embodiments, a multi-mode remote control device or another type of device may send one or more messages using Bluetooth, Wi-Fi, or communication techniques other than IR when the multi-mode remote control device or other device sends an IR command code. The one or more messages may be sent while emitting the IR command code, and may indicate that the multi-mode remote control device or other device sent an IR command code, and/or may indicate the specific IR command code sent. The IR command code may be intended for a first device (e.g., to control the first device), but may be identified by a second device that is programmed to respond to a similar IR command code. The second device may, in response to identifying the IR command code, send a key command to the second device or a third device in communication with the second device. Because of the one or more messages, the system software and/or hardware of the second or third device may determine that the key command received from the second device is related to the IR command code indicated by the one or more messages. In response, the system software and/or hardware may determine that the IR command code was not intended for the second device.

In one or more embodiments, when the system software and/or hardware determines that the IR command code was not intended for the second device, the system software and/or hardware may mask the reception of temporally coincident key commands received from the second device. For example, the system software and/or hardware may ignore the key command and subsequent key commands (e.g., may ignore subsequent IR command codes emitted by the multi-mode remote control device or other device) for a period of time (e.g., the application instance temporarily may deactivate an IR mode). The temporary masking of all or some (e.g., similar key commands based on mapping of key commands with similarities) key commands (e.g., key presses on the multi-mode remote control device) may result in masking intentional key presses intended to control the second device. Alternatively, the system software and/or hardware may mask key commands based on a similarity/ association between the IR command indicated by the one or more messages and another IR command code that the system software and/or hardware identifies as an IR command code that controls the second device. For example, the second device may have access to a table of IR command codes based on the devices controlled by the multi-mode remote control device or other devices. When the system software and/or hardware receives an indication that a first IR command code was emitted, the system software and/or hardware may determine, based on the table, that the first IR command code is a code for the first device, and that the second device may be controlled by a second IR command code that is similar to the first IR command code. The system software and/or hardware therefore may determine that a key command received from the second device corresponds to the first IR command code, that the second device mistook the first IR command code for the second IR command code, and may mask the key command and one or more subsequent key commands from the second device. For example, the masking may include blocking all ingress IR command codes temporarily, or blocking some IR command codes temporarily (e.g., when a received IR command code maps to a similar IR command code).

In one or more embodiments, the system software and/or hardware may be programmed to respond to commands and the one or more messages sent by the multi-mode remote control device or other device. The second device may receive IR command codes emitted by the multi-mode remote control device or other device, and an IR stack of the second device may send corresponding key commands to the system software and/or hardware. The system software and/or hardware may govern the response of the second device to the IR command codes. In particular, when the system software and/or hardware masks a key command received by the second device, the system software and/or hardware may prevent the second device from performing an action in response to the IR command code that resulted in the key command being sent to the system software and/or hardware (e.g., by refraining from sending a corresponding command to control the second device). For example, when the IR command code is a command to increase volume on a stereo receiver, and a television identifies the IR command code, the system software and/or hardware may prevent the television from responding to the IR command code (e.g., from performing an unintended action).

In one or more embodiments, the table (or similarity map) for IR command code similarity may be pre-generated on a per-device coding scheme sparse matrix. As a new device is added to the system, the system software and/or hardware may be in communication with the multi-mode remote control device and/or to other devices to identify the new device and the IR command codes for the new device, allowing the table to be updated with an indication of the new device and the IR command codes for the new device. Alternatively, the table may be generated on-demand to reduce a preprocessing load for unlikely combinations of devices and IR command codes. The similarity of IR command codes may be established by edit distance heuristics (e.g., the based on the clocking and sampling of different IR command codes). The difference (e.g., distance) between any two IR command codes may result in a similarity score. The closer the distance, the higher the similarity score between IR command codes may be. When the similarity score exceeds a threshold similarity score, the system software and/or hardware may determine that an IR command code indicated by the one or more messages from the multi-mode remote control device may correspond to the key command received from the second device, thereby causing the system software and/or hardware to mask key commands received from the second device. The multi-mode remote control device also may communicate its keymap to the system software and/or hardware to consider when evaluating IR command code similarity.

In one or more embodiments, the IR command code similarity and/or masking may be performed locally (e.g., on the client device side) or server-side. For example, the system software and/or hardware may run on the second device, which may be a client device in a user's environment (e.g., living room). The system software and/or hardware may evaluate the IR command code similarity and perform masking locally. Alternatively, the system software and/or hardware may provide the IR command codes, messages, and/or key commands to a server device for analysis, and the server may send commands to the system software and/or hardware to perform masking when the server identifies IR command code similarity between devices as described above.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
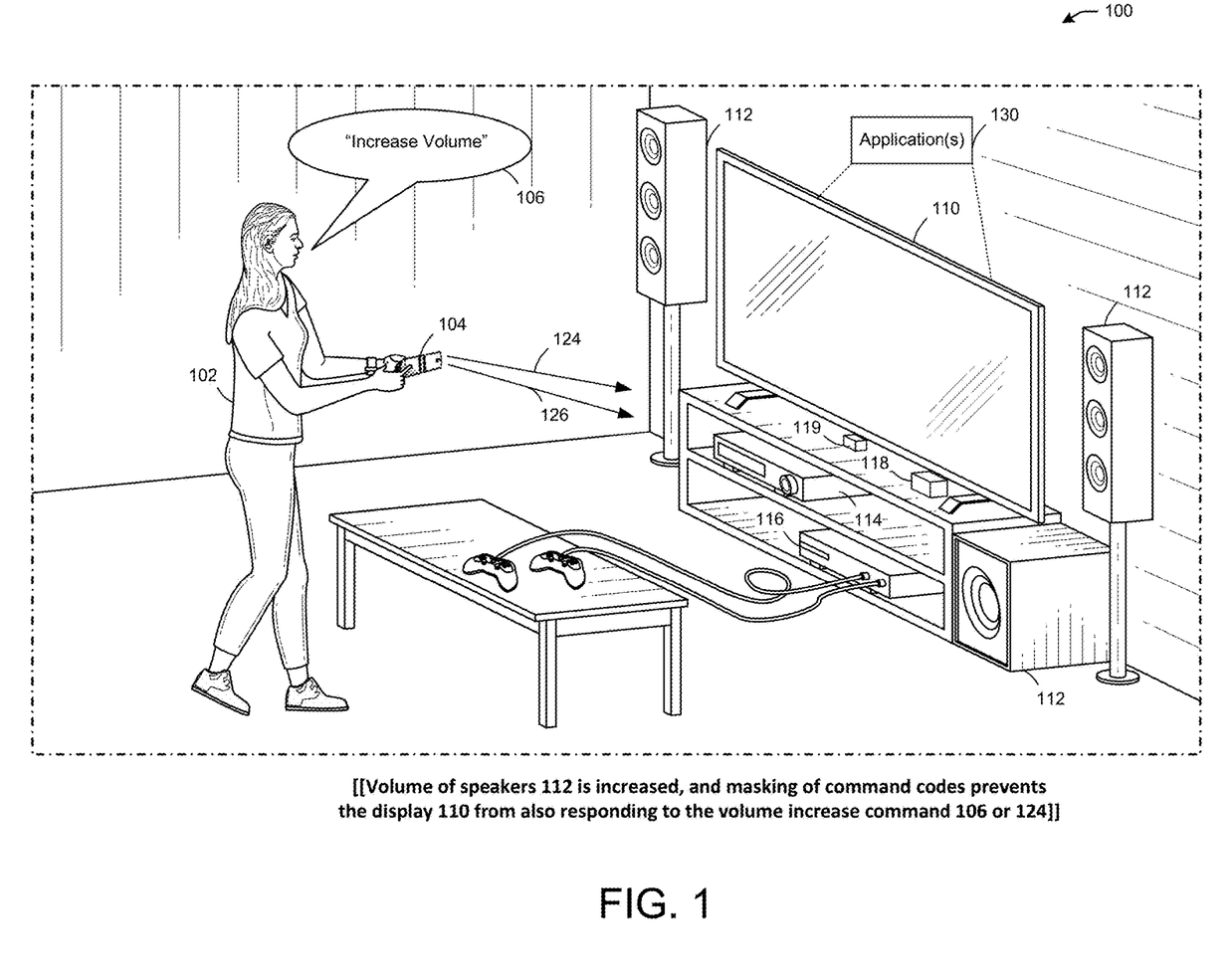
FIG. 1 illustrates an example system of remote control signal masking for multi-mode devices, in accordance with one or more example embodiments of the present disclosure.

FIG. 1 illustrates an example system 100 of remote control signal masking for multi-mode devices, in accordance with one or more example embodiments of the present disclosure.

Referring to FIG. 1, the system 100 may include a person 102 to provide inputs to control one or more devices. As shown, the person 102 may provide voice utterances 106 as inputs (e.g., "Play content," "Increase/Decrease volume," "Channel Up/Down," "Add to playlist," and the like) to a remote control device 104 (e.g., a multi-mode remote control device). The inputs to the remote control device 104 also may include button pushes, touches, gestures, and the like, such as those listed above. The inputs may correspond to commands sent by the remote control device 104 to one or more devices (e.g., a display 110, a speaker system 112, a stereo receiver 114, a game console 116, a streaming media device 118, an IR emitter 119, and the like) to control the one or more devices. In particular, the remote control device 104, the display 110, the streaming media device 118, and/or the IR emitter 119 or another device may emit IR command codes (e.g., IR command codes 124) to the one or more devices, the IR command codes 124 corresponding to actions for the one or more devices to perform. For example, an IR command code may correspond to an action to turn a device on or off, to change a setting, to select and present content, and the like. The IR command codes 124 may be received by any device capable of detecting the IR command codes 124. Because multiple devices may receive the IR command codes 124, there is a possibility that multiple of the devices may identify an IR command code as an IR command code for that device (e.g., the display 110 may identify an IR command code as an IR command code for the display 110, and the stereo receiver 114 controlling the speakers 112 may identify the same IR command code as an IR command code for the receiver 114 and/or the speakers 112). In this manner, an IR command code that uniquely corresponds to an action for a single device to perform may be misinterpreted by a different device, resulting in the different device performing an action unintended by the person 102.

Still referring to FIG. 1, because the remote control device 104 may be multi-modal, the remote control device 104 may send messages 126 (e.g., non-IR messages) in another communication format/using a different communication technique (e.g., Bluetooth, Wi-Fi, etc.). The remote control device 104 may send the messages 126 during the same time that the remote control device 104 emits the IR command codes 124. The one or more devices (e.g., the display 110 as shown, or alternatively the streaming media device 118 or another of the devices) may have one or more applications 130 (e.g., media player applications). When the system software and/or hardware of one of the devices (such as the display 110 or the streaming media device 118—see FIG. 2) receives an indication (e.g., a key command) from one of the devices (e.g., the display 110) indicating that the device (e.g., the display 110) received an IR command code from the remote control device 104 (or another device, such as the IR emitter 119, as discussed with reference to FIG. 2), the display 110 or the streaming media device 118 may determine whether to ignore the key command or to allow the device (e.g., the display 110) to perform an action that corresponds to the key command. To determine whether or not to ignore the key command, the device (e.g., the display 110) may determine whether the remote control device 104 or another device (e.g., as discussed with reference to FIG. 2) sent any of the messages 126 indicating that the remote control device 104 or another device emitted an IR command code, and whether the IR command code emitted by the remote control device 104 or another device corresponds to the key command, or whether the IR command code emitted by the remote control device 104 or another device is a different IR command code intended for another device (e.g., the stereo receiver 114). Using the example of a volume increase command, the display 110 or the streaming media device 118 may determine that the key command received from the display 110 is not the intended command from the remote control device 104 or another device, thereby preventing the display 110 from increasing its volume while the stereo receiver 114 also increases the volume of the speakers 112.

In one or more embodiments, the messages 126 may include an indication of the IR command codes 124 that were emitted by the remote control device 104, or may include an indication that the IR command codes 124 were emitted without identifying the specific IR command codes 124 emitted. The messages 126 may include a time stamp indicating the time when the messages 126 were sent, allowing the one or more applications 130 to determine that the messages 126 were sent concurrently with the IR command codes corresponding to the key commands received by the display 110 or the streaming media device 118 from a device (e.g., the device on which the one or more applications are executing instances, or another device operatively connected to the device on which the one or more applications are executing instances). When the messages 126 identify the specific IR command codes 124 that were emitted, the display 110 or the streaming media device 118 may identify the specific IR command codes 124 and determine whether they are the same as the corresponding key commands. If not, the display 110 or the streaming media device 118 may discard key commands to prevent the wrong device from performing an action, and may deactivate an IR mode temporarily. When the messages 126 do not identify the specific IR command codes 124 that were emitted, the display 110 or the streaming media device 118 may determine whether the key command corresponds to an IR command code of a different device than the one that provided the key command (e.g., using similarity mapping and/or timing information of the messages 126), and if so, the display 110 or the streaming media device 118 may discard key commands to prevent the wrong device from performing an action, and may deactivate an IR mode temporarily. When the display 110 or the streaming media device 118 determines that the key command corresponds to the IR command code emitted by the remote control device 104, the display 110 or the streaming media device 118 may cause a device to perform an action (e.g., may send one or more signals to the device that provided the key command to cause that device to perform a corresponding action).

In one or more embodiments, when display 110 or the streaming media device 118 determines that N IR command code was not intended for the device that provides the key command to the display 110 or the streaming media device 118, the display 110 or the streaming media device 118 may mask the reception of temporally coincident key commands received from the device. For example, the display 110 or the streaming media device 118 may ignore the key command and subsequent key commands (e.g., may ignore subsequent IR command codes emitted by the remote control device 104) for a period of time (e.g., the display 110 or the streaming media device 118 temporarily may deactivate an IR mode). The temporary masking of all key commands (e.g., key presses on the multi-mode remote control device) may result in masking intentional key presses. Alternatively, the display 110 or the streaming media device 118 may mask key commands based on a similarity/association between the IR command indicated by the messages 126 and another IR command code that the display 110 or the streaming media device 118 identify as an IR command code that controls the device that provided the key command. For example, the display 110 or the streaming media device 118 may have access to a table of the IR command codes 124 based on the devices controlled by the remote control device 104 (e.g., established during a set-up process and updated as devices are added/removed). When the display 110 or the streaming media device 118 receives an indication that a first IR command code was emitted, the display 110 or the streaming media device 118 may determine, based on the table, that the first IR command code is a code for a different device, and that the device that provided the key command may be controlled by a second IR command code that is similar to the first IR command code. The display 110 or the streaming media device 118 therefore may determine that a key command received from a device corresponds to the first IR command code, that the device mistook the first IR command code for the second IR command code, and may mask the key command and one or more subsequent key commands received from the device.

Figure 2:
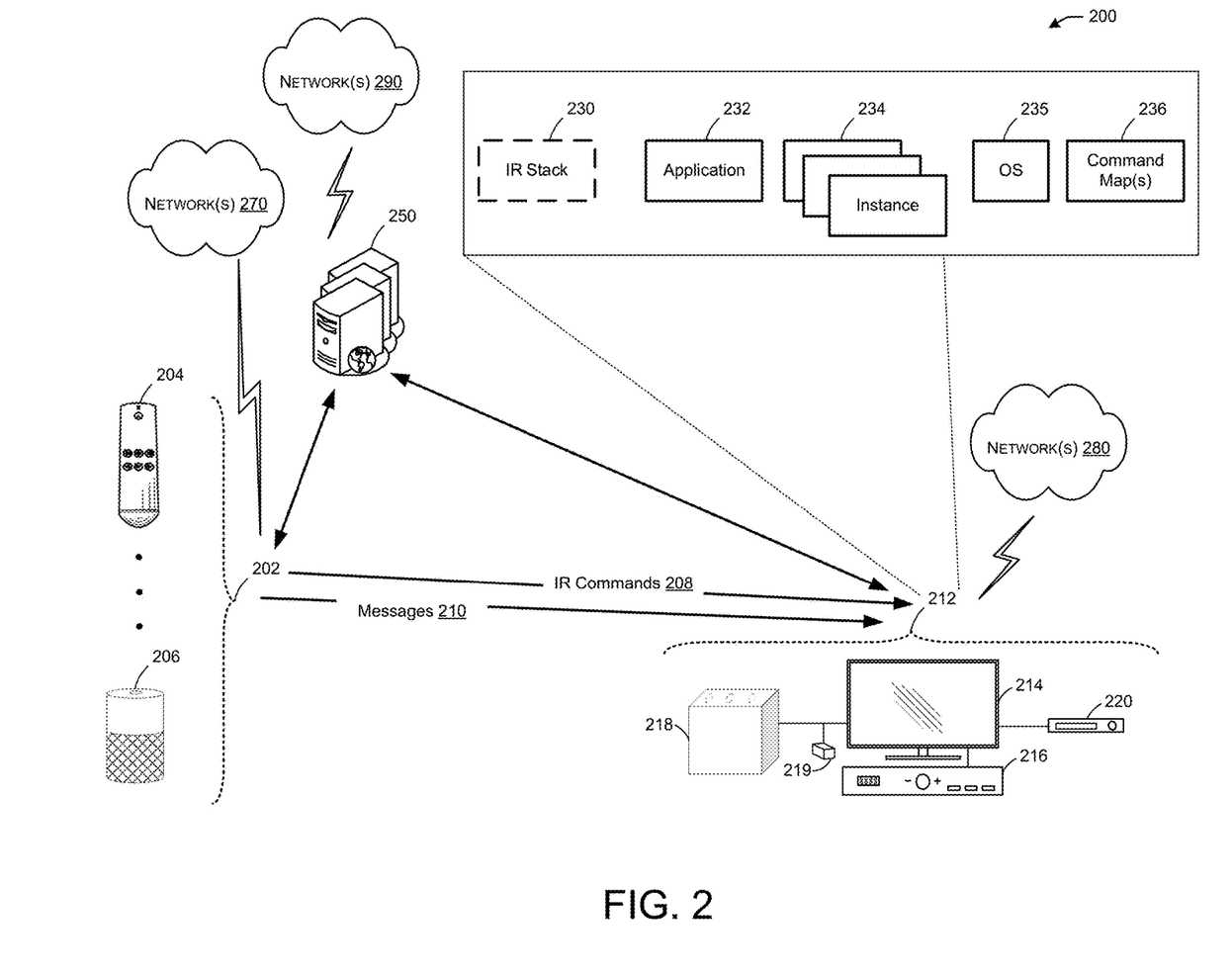
FIG. 2 illustrates an example system of remote control signal masking for multi-mode devices, in accordance with one or more example embodiments of the present disclosure.

In one or more embodiments, the display 110 or the streaming media device 118 may be programmed to respond to the IR command codes 124 and the messages 126 sent by the remote control device 104. A device may receive the IR command codes 124 emitted by the remote control device 104, and an IR stack of the device (e.g., as shown in FIG. 2) may send corresponding key commands to an IR receiving/controlling device (e.g., any of the display 110, the stereo receiver 114, the streaming media device 118, the IR emitter 119, or other devices). The IR receiving/controlling device may govern the response of the device to the IR command codes 124. In particular, when the IR receiving/controlling device masks a key command received by the device, the IR receiving/controlling device may prevent the device from performing an action in response to the IR command code that resulted in the key command being sent to the IR receiving/controlling device (e.g., by refraining from sending a corresponding command to control the device).

In one or more embodiments, the table (or similarity map) for IR command code similarity may be pre-generated on a per-device coding scheme sparse matrix. As a new device is added to the system, the IR receiving/controlling device may be in communication with the remote control device 104 to identify the new device and the IR command codes for the new device, allowing the table to be updated with an indication of the new device and the IR command codes for the new device. Alternatively, the table may be generated on-demand to reduce a preprocessing load for unlikely combinations of devices and IR command codes. The similarity of IR command codes may be established by edit distance heuristics (e.g., the based on the clocking and sampling of different IR command codes). The difference (e.g., distance) between any two IR command codes may result in a similarity score. The closer the distance, the higher the similarity score between IR command codes may be. When the similarity score exceeds a threshold similarity score, the IR receiving/controlling device may determine that an IR command code indicated by the messages 126 from the remote control device 104 may correspond to the key command received from a device, thereby causing the IR receiving/controlling device to mask key commands received from the device.

In one or more embodiments, the messages 126 may be sent using a different communication channel (e.g., different frequency or portion of a frequency band) than the IR command codes 124, allowing a device/application to identify the messages 126 in one channel while receiving the IR command codes 124 or indications of IR command codes 124 in another channel at or near the same time.

In one or more embodiments, the remote control device 104 and any of the devices controlled by the remote control devices (e.g., devices 110-119) may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

FIG. 2 illustrates an example system 200 of remote control signal masking for multi-mode devices, in accordance with one or more example embodiments of the present disclosure.

Referring to FIG. 2, the system 200 may include one or more remote control devices 202 (e.g., similar to the remote control device 104 of FIG. 1, such as device 204 and device 206) for receiving user inputs (e.g., voice commands, touch inputs, gestures, etc.), translating the user inputs into IR commands 208, and emitting the IR commands to one or more devices 212 (e.g., a display 214 similar to the display 110 of FIG. 1, a stereo receiver 216 similar to the stereo receiver 114 of FIG. 1, a streaming media device 218 similar to the streaming media device 118 of FIG. 1, an IR emitter 219 similar to the IR emitter 119 of FIG. 1, a game console 220 similar to the game console 116 of FIG. 1, and the like). Alternatively or in addition, any of the one or more devices 212 may emit IR commands similar to the IR commands 208. The IR commands 208 may correspond to commands to control the speaker system 112, for example. Any IR command of the IR commands 208 may correspond to a single device of the speaker system 112 (e.g., an IR command may uniquely correspond to one or more actions for a single device to perform), causing a device to perform an action, such as to turn on/off, to adjust volume, to change channels, to change inputs (e.g., HDMI 1, HDMI 2, AV, etc.), to select and present content, and the like. The one or more remote control devices 202 or other devices (e.g., one or more cloud-based servers 250) also may send non-IR messages 210 (e.g., using another communication technique such as Bluetooth, Wi-Fi, etc.). In this manner, the one or more remote control devices 202 may be multi-mode remote control devices. The messages 210 may include information to control the one or more devices 212, such as indications that the one or more remote control devices 202 sent the IR commands 208 (e.g., the one or more remote control devices 202 may emit the IR commands 208 and send the messages 210 while emitting the IR commands 208). The messages 210 may be used to determine which of the one or more devices 212 was intended to be controlled by a respective IR command of the IR commands 208. In this manner, non-IR messages may be sent from the same device that emitted an IR command received by the one or more devices 212, or by a different device than the device that emitted an IR command received by the one or more devices 212, allowing the one or more devices 212 to determine whether an IR command and any other IR commands should be masked.

Still referring to FIG. 2, any of the devices 212 may include an IR stack 230 (e.g., an IR protocol stack) for detecting the IR commands 208 and communicating with an application 232 (either on the same device or on another device of the one or more devices 212). For example, the IR stack 230 may send to the application 232 a key command associated with an IR command detected by the device that sends the key command to the application 232. Instances 234 of the application may execute on any of the one or more devices 212 (e.g., on the same device that sends the key command to the application 232 or on another device of the one or more devices 212). For example, the display 214 may include the IR stack 230, and the application 232 and its instances 234 may execute on the display 214 or on the streaming media device 218. Any of the one or more devices 212 may include an operating system (OS) 235 (e.g., representing system software and/or hardware). The display 214 may detect the IR commands 208 from the one or more remote control devices 202 and, when any of the IR commands 208 corresponds to an IR command for the display 214, may send a key command to the OS 235 to indicate that the display 214 received an IR command from the one or more remote control devices 202 or another device. As explained further herein, based on the messages 210 and/or command maps 236 (e.g., similarity maps that map IR command codes for different devices based on their respective similarities—such as based on the pulses used for given IR command codes—which may be determined using edit distance heuristics and the like), the OS 235 may determine whether a key command received from any of the one or more devices 212 indicates that the one or more devices 212 received an IR command code intended to control a different device (e.g., whether the display 214 misinterpreted an IR command code as an IR command code to control the display 214 when the IR command code actually was a different code to control the stereo receiver 216).

Still referring to FIG. 2, one or more cloud-based servers 250 may be in communication with the one or more remote control devices 202 and/or the one or more devices 212. The one or more cloud-based servers 250 may receive data, such as data indicative of voice utterances (e.g., the voice utterance 106 of FIG. 1) received by the one or more remote control devices 202 as inputs, and may translate the voice utterances into instructions for the or more remote control devices 202 and/or the one or more devices 212, such as instructions to cause any of the devices to perform actions (e.g., causing the or more remote control devices 202 to send the IR commands 208 and/or the messages 210). The one or more cloud-based servers 250 may receive the key commands from the one or more devices 212, and may determine, using the command maps 236, whether the key command corresponds to an IR command code that was properly or improperly interpreted, and instructing the application 232 to cause performance of an action or to mask the IR command codes 208. The one or more cloud-based servers 250 and/or the one or more devices 212 may update the command maps 236 as new devices are added or removed from control of the one or more remote control devices 202. The one or more cloud-based servers 250 may send non-IR messages (e.g., similar to the messages 210) that may be used by the one or more devices 212 to determine that a contemporaneous IR command was received, and therefore whether or not to mask the contemporaneous IR command and/or subsequent IR commands received.

In one or more embodiments, the one or more remote control devices 202 and/or the one or more cloud-based servers 250 may send the messages 210 using Bluetooth, Wi-Fi, or communication techniques other than IR when the one or more remote control devices 202 (or another device such as the IR emitter 219) emit an IR command code. The messages 210 may be sent while emitting the IR command code, and may indicate that the one or more remote control devices 202 or another device emitted an IR command code at the same time, and/or may indicate the specific IR command code sent at the time when the message also was sent. The IR command code may be intended for a first device of the one or more devices 212 (e.g., to control the first device), but may be identified by a second device of the one or more devices 212 that is programmed to respond to a similar IR command code. The second device may, in response to identifying the IR command code, send a key command to the OS 235 executing on the second device or a third device in communication with the second device. Because of the messages 210, the OS 235 may determine that the key command received from the second device is related to the IR command code indicated by a message of the messages 210. In response, the OS 235 may determine that the IR command code was not intended for the second device. The messages 210 may include an indication of the key(s) pressed/touched on the one or more remote control devices 202 (or other inputs received by the one or more remote control devices 202), and the OS 235 may determine whether the key(s) or other inputs correspond to a command for the device that provided the key command, or to another device (e.g., using a keymap of the one or more remote control devices 202, as included in the command maps 236).

In one or more embodiments, when the OS 235 determines that the IR command code was not intended for the second device, the OS 235 may mask the reception of temporally coincident key commands received from the second device. For example, the OS 235 may ignore the key command and subsequent key commands (e.g., may ignore subsequent IR command codes emitted by the multi-mode remote control device) for a period of time (e.g., the application instance temporarily may deactivate an IR mode). The temporary masking of all key commands (e.g., key presses on the multi-mode remote control device) may result in masking intentional key presses intended to control the second device. Alternatively, the OS 235 may mask key commands based on a similarity/association between the IR command indicated by the one or more messages and another IR command code that the OS 235 identifies as an IR command code that controls the second device. For example, the OS 235 may have access to a table of IR command codes (e.g., the command maps 236) based on the devices controlled by the multi-mode remote control device (e.g., the one or more devices 212). When the OS 235 receives an indication that a first IR command code was emitted, the OS 235 may determine, based on the table, that the first IR command code is a code for the first device, and that the second device may be controlled by a second IR command code that is similar to the first IR command code. The OS 235 therefore may determine that a key command received from the second device corresponds to the first IR command code, that the second device mistook the first IR command code for the second IR command code, and may mask the key command and one or more subsequent key commands from the second device.

In one or more embodiments, the OS 235 may be programmed to respond to the IR commands 208 and the messages 210 sent by the one or more remote control devices 202. The second device may receive IR command codes emitted by the one or more remote control devices 202, and the IR stack 230 of the second device may send corresponding key commands to the OS 235. The OS 235 may govern the response of the second device to the IR commands 208. In particular, when the OS 235 masks a key command received by the second device, the OS 235 may prevent the second device from performing an action in response to the IR command code that resulted in the key command being sent to the OS 235 (e.g., by refraining from sending a corresponding command to control the second device). For example, when the IR command code is a command to turn on the stereo receiver 216, and the display 214 identifies the IR command code, the OS 235 may prevent the display 214 from responding to the IR command code (e.g., from performing an unintended action).

In one or more embodiments, the command maps 236 may be pre-generated on a per-device coding scheme sparse matrix. As a new device is added to the system, the one or more devices 212 may be in communication with the one or more remote control devices 202 and/or the one or more cloud-based servers 250 to identify the new device and the IR command codes for the new device, allowing the command maps 236 to be updated with an indication of the new device and the IR command codes for the new device. Alternatively, the command maps 236 may be generated on-demand to reduce a preprocessing load for unlikely combinations of devices and IR command codes. The similarity of IR command codes may be established by edit distance heuristics (e.g., the based on the clocking and sampling of different IR command codes). The difference (e.g., distance) between any two IR command codes may result in a similarity score. The closer the distance, the higher the similarity score between IR command codes may be. When the similarity score exceeds a threshold similarity score, the OS 235 may determine that an IR command code indicated by the one or more messages from the one or more remote control devices 202 may correspond to the key command received from the second device, thereby causing the OS 235 to mask key commands received from the second device. The one or more remote control devices 202 also may communicate a keymap to the OS 235 to consider when evaluating IR command code similarity.

In one or more embodiments, the one or more remote control devices 202 may include any combination of buttons, touch pads, touch screens, microphones, motion sensors, accelerometers, and other input devices able to detect touches, movements, sounds, and gestures on or with the one or more remote control devices 202. The one or more remote control devices 202 may receive inputs and translate the inputs into commands, such as infrared, optical, or other types of signals. The one or more remote control devices 202 may connect to the one or more device 212 using Bluetooth, peer-to-peer, Wi-Fi, or other connections.

Any of the one or more remote control devices 202, the one or more devices 212, and/or the one or more cloud-based servers 250 may be configured to communicate with each other via one or more communications networks 270, 280, and/or 290 wirelessly or wired. Any of the communications networks 270, 280, and/or 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 270, 280, and/or 290 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 270, 280, and/or 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the one or more devices 212 may include one or more communications antennas. The one or more communications antennas may be any suitable type of antennas corresponding to the communications protocols used by the one or more devices 212. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the one or more devices 212.

Figure 6:
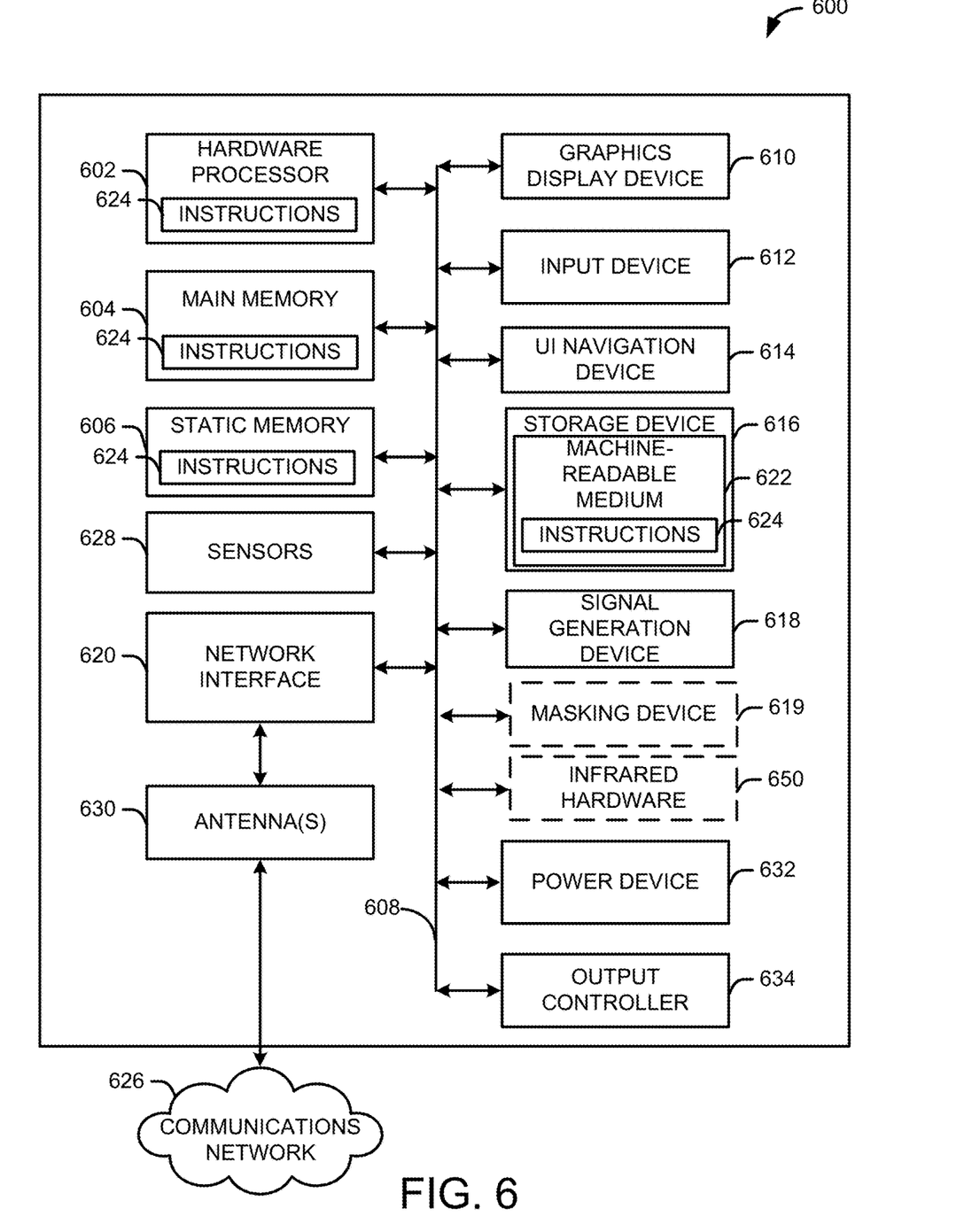
FIG. 6 illustrates a block diagram of an example machine upon which any of one or more techniques (e.g., methods) may be performed, in accordance with one or more example embodiments of the present disclosure.

The one or more remote control devices 202 and the one or more devices 212 may include hardware both for wireless communications such as Bluetooth and Wi-Fi, and also IR hardware (as shown in FIG. 6), such as photodiodes used to emit and detect IR signals.

Figure 3:
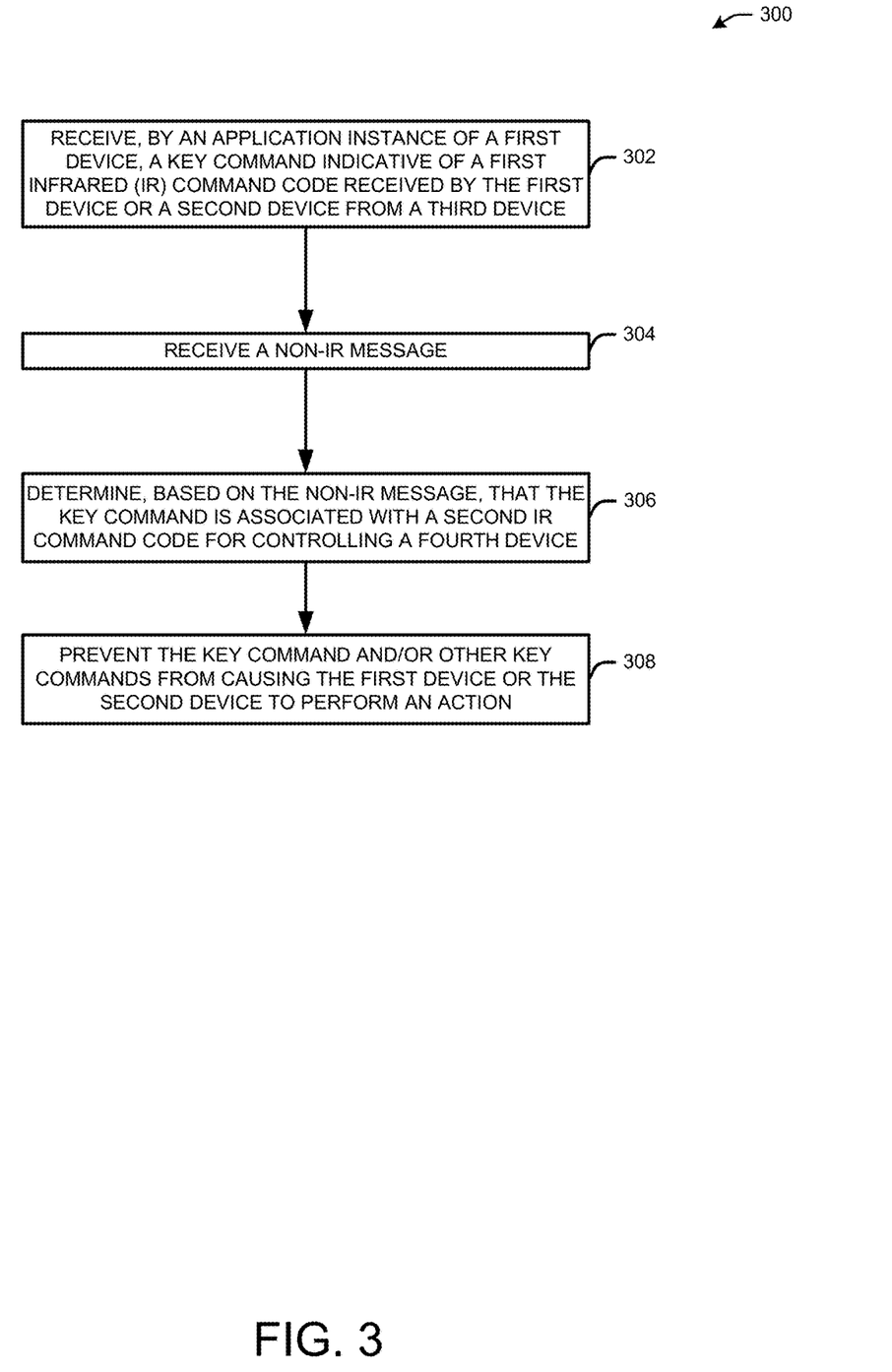
FIG. 3 illustrates a flow diagram for a process for remote control signal masking for multi-mode devices, in accordance with one or more example embodiments of the present disclosure.

FIG. 3 illustrates a flow diagram for a process 300 for remote control signal masking for multi-mode devices, in accordance with one or more example embodiments of the present disclosure.

At block 302, a device (e.g., the OS 235 executing on one of the one or more devices 212 of FIG. 2) may receive a key command from the device or a second device (e.g., of the one or more devices 212 of FIG. 2), the key command indicating that the device or the second device (e.g., operatively linked to the device) detected a first IR command code (e.g., of the IR commands 208 of FIG. 2) from a third device, such as multi-mode remote control device (e.g., the one or more remote control devices 202 of FIG. 2) or another device (e.g., the one or more cloud-based servers 250 and/or the one or more devices 212 of FIG. 2). The key command may be sent by an IR stack of the device or of the second device (e.g., the IR stack 230 of FIG. 2) because the device or the second device detected the first IR command code and identified the IR command code as one that corresponds to an action to be performed by the device or the second device (e.g., to turn on/off, to select/present content, to change a setting, etc.).

At block 304, the device may receive a non-IR message (e.g., of the messages 210 of FIG. 2) from the multi-mode remote control device or another device. The non-IR message may be sent and received using another communication technique, such as Wi-Fi, Bluetooth, ZigBee, etc. The non-IR message may be sent during the same time when the multi-mode remote control device or another device sent the first IR command code, and may be used by the multi-mode remote control device to indicate to the device (e.g., the application instance) that the multi-mode remote control device emitted an IR command code at the same time, allowing the device to determine whether the key command was properly identified by the device or the second device. In this manner, the device that emitted the first IR command code may be the same as or different than the device that device that sent the non-IR message.

At block 306, the device may determine, based on the non-IR message, that the key command is associated with a second IR command code (e.g., of the IR commands 208 of FIG. 2) for controlling a fourth device (e.g., not the device that provided the key command indicative of the first IR command code). In one embodiment, the non-IR message may indicate a specific IR command code that the multi-mode remote control device emitted at the time when the multi-mode remote control device or another device sent the non-IR message (e.g., as indicated by a timestamp of the non-IR message). The device may determine whether the first IR command code is the IR command code indicated by the non-IR message. The device may determine that the IR command code indicated by the non-IR message is a different IR command code than the one corresponding to the key command, and may identify the IR command code indicated by the non-IR message as one used to control the fourth device (e.g., using the command maps 236 of FIG. 2). In another embodiment, the non-IR message may not indicate the specific IR command code emitted by the multi-mode remote control device or another device was emitted at the time when the multi-mode remote control device or other device sent the non-IR message, but rather may provide a more general indication that the multi-mode remote control device or another device emitted an unidentified IR command code to the fourth device. The non-IR message may include an indication of the key(s) pressed/touched on the multi-mode remote control device (or other inputs received by the multi-mode remote control device) or other device, and the device may determine whether the key(s) or other inputs correspond to a command for the device or second device, or to the fourth device (e.g., using a keymap of the multi-mode remote control device or the other device).

At block 308, the device may prevent the key command from causing the device or second device from performing an action (e.g., may mask the key command). For example, the device may discard the key command instead of responding to the key command by performing an action or instead of sending instructions to the device or second device to perform the action. Optionally, the device may deactivate an IR mode of the device or second device for a time period (e.g., temporal masking) or may mask IR command codes on a code-association/similarity basis (e.g., using the command maps 236 of FIG. 2 to identify similar IR command codes that correspond to a device other than the device or second device, and masking key commands from the device or second device that match similar IR command codes for a different device). The similarity map (e.g., the command maps 236 of FIG. 2) may be generated on a per-device by per-coding scheme matrix, or on demand to reduce a preprocessing load for unlikely combinations. The similarity of codes may be determined using edit-distance heuristics or other techniques for analyzing the command codes. After a time period has expired, the device may reactivate the IR mode, optionally. The masking includes blocking and discarding of all received key commands during a time period, or key commands that map to similar key commands (e.g., based on the similarity mapping indicating similarities between key commands that correspond to different devices).

Figure 4:
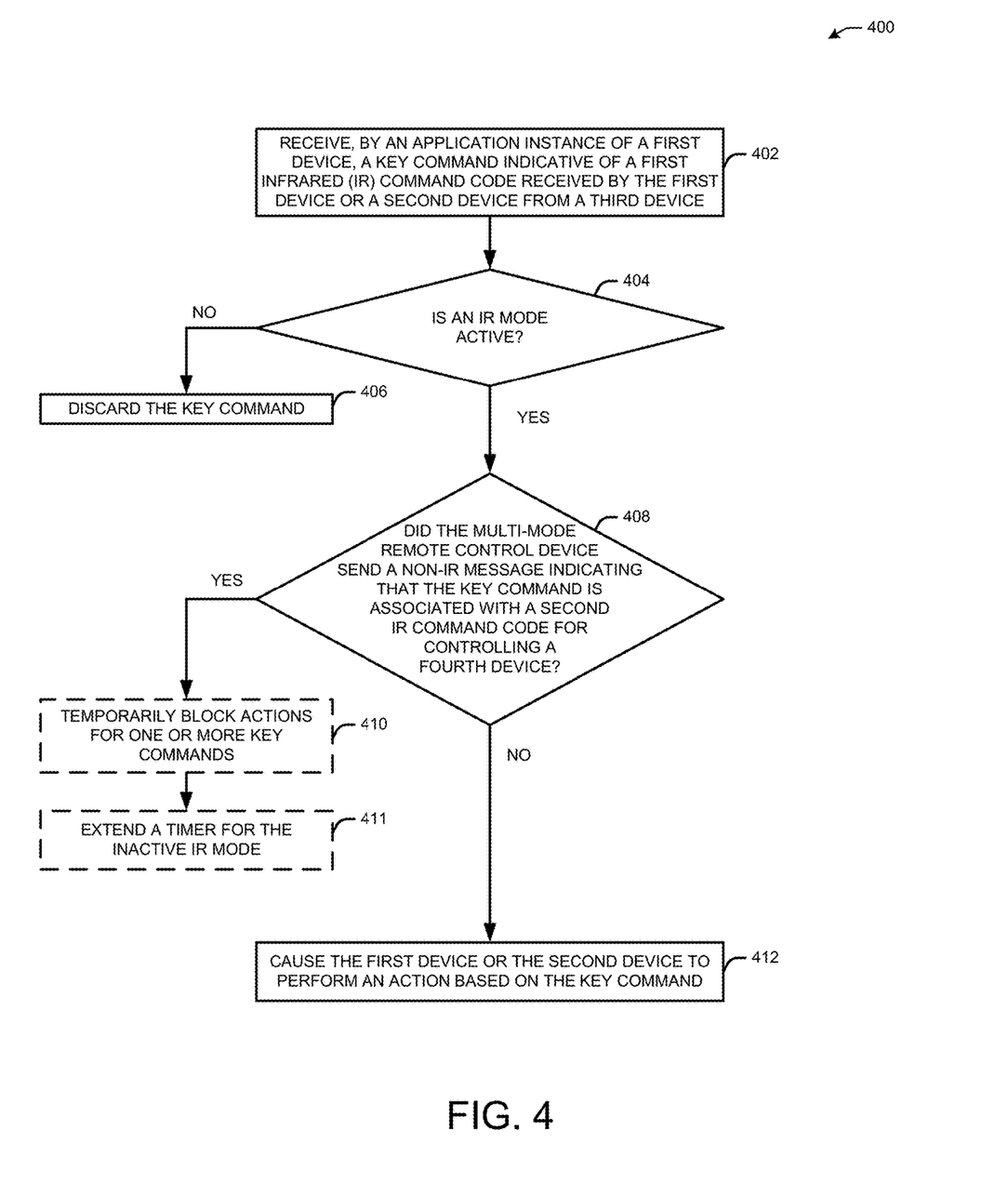
FIG. 4 illustrates a flow diagram for a process for remote control signal masking for multi-mode devices, in accordance with one or more example embodiments of the present disclosure.

FIG. 4 illustrates a flow diagram for a process 400 for remote control signal masking for multi-mode devices, in accordance with one or more example embodiments of the present disclosure.

At block 402, a device (e.g., OS 235 executing on one of the one or more devices 212 of FIG. 2) may receive a key command from the device or a second device (e.g., of the one or more devices 212 of FIG. 2), the key command indicating that the device or the second device (e.g., operatively linked to the device) detected a first IR command code (e.g., of the IR commands 208 of FIG. 2) from a third device, such as a multi-mode remote control device (e.g., the one or more remote control devices 202 of FIG. 2) or another device (e.g., the one or more cloud-based servers 250 and/or the one or more devices 212 of FIG. 2). The key command may be sent by an IR stack of the device or of the second device (e.g., the IR stack 230 of FIG. 2) because the device or the second device detected the first IR command code and identified the IR command code as one that corresponds to an action to be performed by the device or the second device (e.g., to turn on/off, to select/present content, to change a setting, etc.).

At block 404, the device may determine whether an IR mode of the device or second device is active (e.g., whether the IR mode has been deactivated as part of a temporary masking scheme). The IR mode may be active or inactive for all key commands, or may be inactive for some key commands (e.g., key commands that map to similar key commands based on the similarity mapping indicating similarities between key commands that correspond to different devices). When the IR mode is inactive, the device may discard the key command at block 406 to mask the key command. At block 406, when the IR mode is inactive (e.g., masking is active), the device may discard the key command and prevent the first or second device from performing an action based on the first IR command code.

When the IR mode is active and temporal masking is not being performed, the process 400 may continue at block 408, where the device may determine whether the multi-mode remote control device or another device sent a non-IR message (e.g., of the messages 210 of FIG. 2) indicating that the key command is associated with a second IR command code for controlling a fourth device. In one embodiment, the non-IR message may indicate a specific IR command code that the multi-mode remote control device or another device emitted at the time when the multi-mode remote control device or another device sent the non-IR message (e.g., as indicated by a timestamp of the non-IR message). The device may determine whether the first IR command code is the IR command code indicated by the non-IR message. The device may determine that the IR command code indicated by the non-IR message is a different IR command code than the one corresponding to the key command, and may identify the IR command code indicated by the non-IR message as one used to control the fourth device (e.g., using the command maps 236 of FIG. 2). In another embodiment, the non-IR message may not indicate the specific IR command code emitted by the multi-mode remote control device or another device was emitted at the time when the multi-mode remote control device or another device sent the non-IR message, but rather may provide a more general indication that the multi-mode remote control device or another device emitted an unidentified IR command code to the fourth device. The non-IR message may include an indication of the key(s) pressed/touched on the multi-mode remote control device (or other inputs received by the multi-mode remote control device) or another device, and the device may determine whether the key(s) or other inputs correspond to a command for the device or second device, or to the fourth device (e.g., using a keymap of the multi-mode remote control device or another device).

When the device determines, based on the non-IR message, that the key command is associated with the second IR command code for the third device, the device may block actions for the key command and/or other key commands. For example, the device may discard the key command and optionally, at block 410, may implement temporal masking by deactivating the IR mode for a time period (e.g., to mask one or more key commands, whether all key commands or those that map to similar key commands using a similarity mapping, for example). Optionally, at block 411, the device may extend the time period during which the IR mode is to be inactive. When the IR mode is active and temporal masking is not being performed, the device may determine whether the key command maps to a similar key command, and therefore is a key command likely to be confused (e.g., as part of block 408).

When the device determines, based on the non-IR message, that the key command is associated with the second IR command code for the third device (e.g., is associated with the first command code), the device at block 412 may cause the first or second device (e.g., the device that provided the key command indication to the device) to perform an action (e.g., corresponding to the key command). For example, the device may execute instructions to perform the action, such as selecting and playing content, or may send instructions to the first or second device to perform the action.

Figure 5:
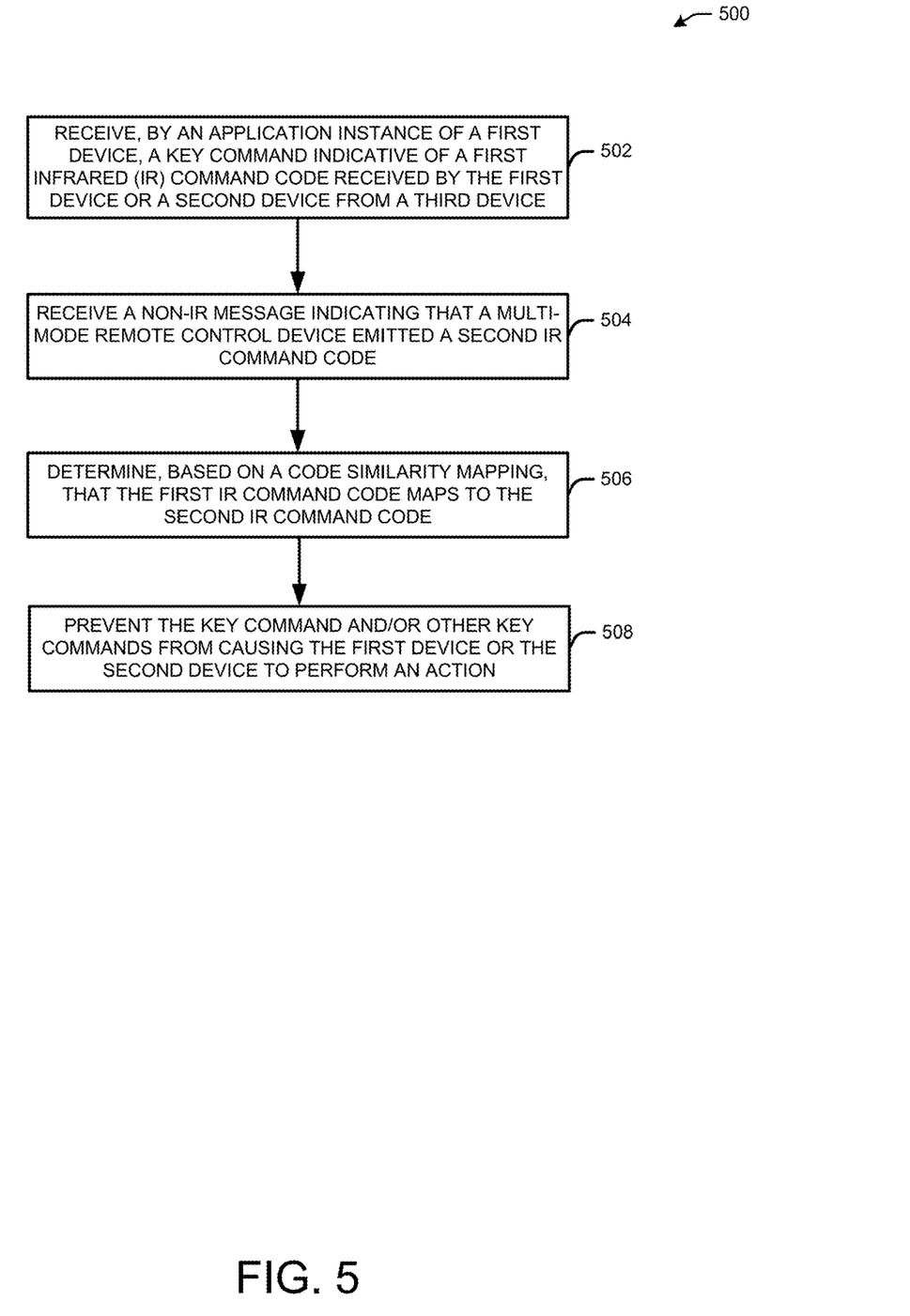
FIG. 5 illustrates a flow diagram for a process for remote control signal masking for multi-mode devices, in accordance with one or more example embodiments of the present disclosure.

FIG. 5 illustrates a flow diagram for a process 500 for remote control signal masking for multi-mode devices, in accordance with one or more example embodiments of the present disclosure.

At block 502, a device (e.g., the OS 235 executing on one of the one or more devices 212 of FIG. 2) may receive a key command from the device or a second device (e.g., of the one or more devices 212 of FIG. 2), the key command indicating that the device or the second device (e.g., operatively linked to the device) detected a first IR command code (e.g., of the IR commands 208 of FIG. 2) from a multi-mode remote control device (e.g., the one or more remote control devices 202 of FIG. 2). The key command may be sent by an IR stack of the device or of the second device (e.g., the IR stack 230 of FIG. 2) because the device or the second device detected the first IR command code and identified the IR command code as one that corresponds to an action to be performed by the device or the second device (e.g., to turn on/off, to select/present content, to change a setting, etc.).

At block 504, the device may receive a non-IR message (e.g., of the messages 210 of FIG. 2) from a third device, such as the multi-mode remote control device or another device (e.g., the one or more devices 212 or the one or more cloud-based servers 250 of FIG. 2). The non-IR message may be sent and received using another communication technique, such as Wi-Fi, Bluetooth, ZigBee, etc. The non-IR message may be sent during the same time when the multi-mode remote control device or another device sent the first IR command code, and may be used by the multi-mode remote control device or another device to indicate to the device (e.g., the OS 235) that the multi-mode remote control device or another device emitted a second IR command code at the same time, allowing the device to determine whether the key command was properly identified by the device or the second device.

At block 506, the device may determine, based on a code similarity mapping (e.g., the command maps 236 of FIG. 2), that first IR command code maps to the second IR command code for controlling a fourth device (e.g., not the device that provided the key command indicative of the first IR command code). The code similarity mapping may map IR command codes for different devices based on their similarities (e.g., using edit-distance heuristics or other techniques). In one embodiment, the non-IR message may indicate a specific IR command code that the multi-mode remote control device emitted at the time when the multi-mode remote control device sent the non-IR message (e.g., as indicated by a timestamp of the non-IR message). The device may determine whether the first IR command code is the IR command code indicated by the non-IR message. The device may determine that the IR command code indicated by the non-IR message is a different IR command code than the one corresponding to the key command, and may identify the IR command code indicated by the non-IR message as one used to control the fourth device (e.g., using the command maps 236 of FIG. 2). In another embodiment, the non-IR message may not indicate the specific IR command code emitted by the multi-mode remote control device or another device was emitted at the time when the multi-mode remote control device or another device sent the non-IR message, but rather may provide a more general indication that the multi-mode remote control device or another device emitted an unidentified IR command code to the fourth device. The non-IR message may include an indication of the key(s) pressed/touched on the multi-mode remote control device (or other inputs received by the multi-mode remote control device or another device), and the device may determine whether the key(s) or other inputs correspond to a command for the device or second device, or to the fourth device (e.g., using a keymap of the multi-mode remote control device or another device).

At block 508, the device may prevent the key command from causing the device or second device from performing an action (e.g., may mask the key command). For example, the device may discard the key command instead of responding to the key command by performing an action or instead of sending instructions to the device or second device to perform the action. The device may deactivate an IR mode of the device or second device for a time period (e.g., temporal masking), for one or more command codes (e.g., key commands) or may mask IR command codes on a code-association/similarity basis (e.g., using the command maps 236 of FIG. 2 to identify similar IR command codes that correspond to a device other than the device or second device, and masking key commands from the device or second device that match similar IR command codes for a different device). The similarity map (e.g., the command maps 236 of FIG. 2) may be generated on a per-device by per-coding scheme matrix, or on demand to reduce a preprocessing load for unlikely combinations. The similarity of codes may be determined using edit-distance heuristics or other techniques for analyzing the command codes. After a time period has expired, the device may reactivate the IR mode.

The examples presented herein are not intended to be limiting.

FIG. 6 illustrates a block diagram of an example of a machine 600 (e.g., the remote control device 104 of FIG. 1, the display 110 of FIG. 1, the speaker system 112 of FIG. 1, the stereo receiver 114 of FIG. 1, the game console 116 of FIG. 1, the streaming media device 118 of FIG. 1, the one or more remote control devices 202 of FIG. 2, the one or more devices 212 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker, or emitters such as light-emitting diodes if the machine 600 is a remote control device), a masking device 619, a network interface device/transceiver 620 coupled to antenna(s) 630, and one or more sensors 628, such as IR sensors, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a media device, etc.)). The machine 600 may include IR hardware 650 (e.g., the IR stack 230 of FIG. 2, photodiodes for emitting/detecting IR signals, and the like).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The masking device 619 may carry out or perform any of the operations and processes (e.g., process 300 of FIG. 3, process 400 of FIG. 4, process 500 of FIG. 5) described and shown above. For example, the masking device 619 may execute the application 232 of FIG. 2 using the instances 234 of FIG. 2, causing the machine 600 to perform any of the operations and processes described and shown above.

It is understood that the above are only a subset of what the masking device 619 may be configured to perform and that other functions included throughout this disclosure may also be performed by the masking device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for masking infrared (IR) command codes, the method comprising:
   receiving, by a first device, a first key command from an IR stack of the first device or of a second device operatively connected to the first device, wherein the first key command corresponds to a first IR command code received by the IR stack and is intended to control the first device or the second device;
   receiving, by the first device, a message using a Wi-Fi communication technique or a Bluetooth communication technique, wherein the message indicates that the first key command corresponds to a second IR command code that has been sent by another device and is intended to control a third device, the second IR command code different than the third IR command code;

determining, by the first device, based on the message, that the first key command corresponds to the second IR command code for controlling the third device instead of to the first IR command code;
preventing, by the first device, based on the determination that the first key command corresponds to the second IR command code for controlling the third device, the first key command from causing the first device or the second device to perform an action;
deactivating, by the first device, based on the determination that the first key command corresponds to the second IR command code for controlling the third device, an IR mode of a media player application instance for a time period;
receiving, by the first device, a second key command from the IR stack during the time period, wherein the second key command corresponds to a third IR command code received by the IR stack; and
discarding, by the first device, the second key command.

2. The method of claim 1, further comprising:
determining that the time period has expired; and
activating based on the determination that the time period has expired, the IR mode of the media player application instance.

3. The method of claim 1, further comprising:
determining, based on a mapping, that the first IR command code maps to the second IR command code,
wherein determining that the first key command corresponds to the second IR command code is based on determining that the first IR command code maps to the second IR command code.

4. The method of claim 1, further comprising:
determining that the message includes an indication of the second IR command code,
wherein determining that the first key command corresponds to the second IR command code is based on the indication of the second IR command code.

5. A method for masking infrared (IR) command codes, the method comprising:
receiving, by at least one processor of a first device, a first key command from the first device or a second device operatively connected to the first device, wherein the first key command corresponds to a first IR command code received by the first device or the second device and is intended to control the first device or the second device;
receiving, by the at least one processor, a message using a communication technique different than IR, wherein the message indicates that the first key command corresponds to a second IR command code that has been sent by another device and is intended to control a third device, the second IR command code different than the first IR command code;
determining, by the at least one processor, based on the message, that the first key command corresponds to the second IR command code for controlling the third device instead of to the first IR command code; and
preventing, by the at least one processor, based on the determination that the first key command corresponds to the second IR command code for controlling the third device, the first key command from causing the first device or the second device to perform an action.

6. The method of claim 5, wherein the first key command is indicative of the first IR command code being received by the first device from a multi-mode remote control device, the method further comprising:
determining, based on a mapping, that the first IR command code maps to the second IR command code,
wherein determining that the first key command corresponds to the second IR command code is based on determining that the first IR command code maps to the second IR command code, and
wherein the preventing comprises preventing the first key command from causing the first device to perform the action.

7. The method of claim 5, wherein the first key command is indicative of the first IR command code being received by the second device from a multi-mode remote control device, the method further comprising:
determining, based on a mapping, that the first IR command code maps to the second IR command code,
wherein determining that the first key command corresponds to the second IR command code is based on determining that the first IR command code maps to the second IR command code, and
wherein the preventing comprises preventing the first key command from causing the second device to perform the action.

8. The method of claim 5, wherein the communication technique is Wi-Fi or Bluetooth.

9. The method of claim 5, further comprising:
determining that the message includes an indication of the second IR command code,
wherein determining that the first key command corresponds to the second IR command code is based on the indication of the second IR command code.

10. The method of claim 5, further comprising:
deactivating, based on the determination that the first key command corresponds to the second IR command code for controlling the third device, an IR mode of the first device.

11. The method of claim 10, wherein the IR mode is deactivated for a time period, the method further comprising:
receiving a second key command from the first device or the second device during the time period, wherein the second key command corresponds to a third IR command code received by the first device or the second device; and
discarding the second key command, wherein the preventing is based on the discarding.

12. The method of claim 10, wherein the IR mode is deactivated for a time period, the method further comprising:
determining that the time period has expired; and
activating, based on the determination that the time period has expired, the IR mode of the first device.

13. The method of claim 5, further comprising:
determining a first time associated with receiving the message; and
determining a second time associated with receiving the first key command from the first device or the second device,
wherein determining that the first key command corresponds to the second IR command code is based on the first time and the second time.

14. The method of claim 5, further comprising:
receiving a second key command from the first device or the second device, wherein the second key command corresponds to a third IR command code received by the first device or the second device;

receiving a second message;

determining, based on the second message, that the third IR command code corresponds to the second key command; and causing the first device or the second device to perform a second action based on the second key command.

15. A device for masking infrared (IR) command codes, the device comprising memory coupled to at least one processor, the at least one processor configured to:

receive a first key command from the device, wherein the first key command corresponds to a first IR command code received by the device and is intended to control the device;

receive a message using a communication technique different than IR, wherein the message indicates that the first IR command code corresponds to a second IR command code that has been sent by another device and is intended to control a second device, the second IR command code different than the first IR command code;

determine, based on the message, that the first key command corresponds to the second IR command code for controlling the second device instead of to the first IR command code; and prevent, based on the determination that the first key command corresponds to the second IR command code for controlling the second device, the first key command from causing the device to perform an action.

16. The device of claim 15, wherein the at least one processor is further configured to:

deactivate, based on the determination that the first key command corresponds to the second IR command code for controlling the second device, an IR mode of the device.

17. The device of claim 15, wherein the at least one processor is further configured to:

determine, based on a mapping, that the first IR command code maps to the second IR command code, wherein to determine that the first key command corresponds to the second IR command code is based on the determination that the first IR command code maps to the second IR command code.

18. The device of claim 15, wherein the at least one processor is further configured to:

determine that the message includes an indication of the second IR command code, wherein to determine that the first key command corresponds to the second IR command code is based on the indication of the second IR command code.

19. The device of claim 15, wherein the at least one processor is further configured to:

determine a first time associated with receiving the message; and determine a second time associated with receiving the first key command, wherein to determine that the first key command corresponds to the second IR command code is based on the first time and the second time.

20. The device of claim 15, wherein the communication technique is Wi-Fi or Bluetooth.

* * * * *